United States Patent [19]

Fiedler

[11] Patent Number: 5,042,397
[45] Date of Patent: Aug. 27, 1991

[54] PALLET CONSTRUCTION

[76] Inventor: Leslie C. Fiedler, Rte. 12, Box 157C, Bakersfield, Calif. 92503

[21] Appl. No.: 80,343

[22] Filed: Jul. 31, 1987

[51] Int. Cl.⁵ .............................................. B65D 19/00
[52] U.S. Cl. ...................................... 108/51.1; 108/901
[58] Field of Search ...................... 108/51.3, 51.1, 901, 108/902

[56] References Cited

U.S. PATENT DOCUMENTS

| | | | |
|---|---|---|---|
| 3,697,029 | 10/1972 | Lauffer | 108/51.1 X |
| 3,717,922 | 2/1973 | Witkowski | 108/901 X |
| 3,719,157 | 3/1973 | Arcocha et al. | 108/901 X |
| 3,832,955 | 9/1974 | Pottinger et al. | 108/901 X |
| 3,861,326 | 1/1975 | Brown | 108/901 X |
| 3,878,796 | 4/1975 | Morrison | 108/901 X |
| 3,880,092 | 4/1975 | Seeber et al. | 108/901 X |
| 3,911,182 | 10/1975 | Lieberman | 108/51.1 X |
| 4,061,813 | 12/1977 | Geimer et al. | 108/51.1 X |
| 4,159,681 | 7/1979 | Vandament | 108/901 X |
| 4,220,100 | 9/1980 | Palomo et al. | 108/51.1 |
| 4,230,049 | 10/1980 | Horne | 108/901 X |
| 4,424,753 | 1/1984 | Eatherton | 108/51.1 |
| 4,614,277 | 9/1986 | Fourie et al. | 108/51.1 X |
| 4,649,007 | 3/1987 | Bonis et al. | 108/51.1 X |

FOREIGN PATENT DOCUMENTS

| | | | |
|---|---|---|---|
| 2706554 | 8/1978 | Fed. Rep. of Germany | 108/901 |
| 6715765 | 5/1968 | Netherlands | 108/901 |

Primary Examiner—Jose V. Chen
Attorney, Agent, or Firm—Donald D. Mon

[57] ABSTRACT

A load carrying pallet having a platform and a plurality of runners beneath the platform. The platform and all runners are made of composite comprising a corrugation of sheet material with crests and troughs. The troughs are filled with buttresses, and a skin layer of linear reinforcing strands is laid on this combination. All is bonded together to form a monolithic composite.

3 Claims, 2 Drawing Sheets

PALLET CONSTRUCTION

FIELD OF THE INVENTION

The invention relates to pallets for the support of articles, for example fork lift pallets.

BACKGROUND OF THE INVENTION

Pallets for the storage and transportation of articles are in widespread usage. The most common example is a pallet which includes a solid platform with runners on the bottom to support the platform above some underlying surface or article, or a plurality of slats joined to the runners for the same purpose. The spacing between the slats and the underlying surface is defined by the thickness of the runners. In turn this thickness is determined by the situations in which the pallet is to be used. If it is a forklift pallet, then the thickness must be at least as great as the thickness of the forklift blades. Another consideration is to provide adequate columnar strength to support the loads transferred from the slats or platform. Still another deteminant, especially as to the slats is that there be sufficient bending strength to resists bending forces applied by the load which generate a tensile stress in the bottom of the slat.

It is a simple matter to over design a pallet. Reduced to absurdity, a heavy steel plate with thick-walled tubular steel runners could be expected to handle almost any load that would be manipulable by a forklift. This absurdity illustrates two important aspects of forklift design: cost and weight.

Pallets are subjected to rough usage, and their useful life before repair, especially wooden pallets, is surprisingly short. It is common to use wooden slats and runners that are nailed together to form the pallet. Wood is a relatively inexpensive material, and the cost of a assembling the pallet is acceptable. for many uses, especially for closed circuit shipping, where the pallet is returned for re-use, this is an acceptable construction. However, it is bulky, and it is heavy.

For one-way pallets the situation is often very different. These frequently are used for air freight shipments, and in other transactions which are weight-related as well as volume-related. When heavier pallets are used, it is not unusual for shipping capacity to "weigh out" before it "cubes out". This is to say that where the weight capacity is reached there still remains unfilled volume that cannot be utilized because the weight limit has been reached. The pallet weight therefore reduces the number of articles that could otherwise be shipped.

For example, an inexpensive wood pallet weighs about 60 pounds and presently costs about $4.85. In a routine shipment involving about 25 such pallets, weight savings attainable with the use of this invention (which weighs only about 6½ pounds for many useful embodiments), enable the shipment to contain one more pallet full of articles.

The foregoing example relates weight and cubage. There is another even more pertinent example, where the pallets are used in air freight shipments in which weight is a primary determinant of shipping costs. At the present time, airfreight from California to Australia costs about $2.51 per pound, and this rate includes the pallets. The articles must usually be palletized, and the weight of the pallet is a severe economic burden.

It follows from the above that a more expensive pallet which weighs less can be the most economical device to use. Obviously all of the parameters must be taken into account, but it is a fact that there are literally thounsands of applications where a costlier pallet that will be discarded after one use will be on balance the most economical choice. If for some reason the pallet can be reused or used for another purpose, the economy is even greater.

Accordingly, it is not the objective of this invention to produce the lowest priced pallet. It is to produce a pallet adequate for the intended purposes with a lesser tare weight to justify the increased cost and still create net savings.

The term "adequate for the intended use" defines another objective- to provide just enough strength, of course with the least practicable cost and weight.

It is an object of this invention to provide such a pallet, utilizing a composite structure, and to the maximum extent to use commonly available materials such as are used in the building trades. Such materials themselves have long been subjected to intense scrutiny as to strength and economy of cost, and are ideally suited for use in structures such as pallets.

BRIEF DESCRIPTION OF THE INVENTION

This invention is a pallet having a platform, either formed as a solid plate, or as a plurality of parallel slats, attached to a plurality of runners on their bottom faces. Although the platform and runners could be made of different materials, best advantage is attained if all are made of the same composite material. For example, it makes little sense to have composite slats and wooden runners.

The composite from which the platform and slats are preferably formed is a corrugation of material which when side-supported provides suitable columnar strength to resist crushing. Buttress material fills in the corrugations to provide side support and at least some columnar strength. The supported corrugation is overlaid top and bottom with a sheet of material having tensile properties to resist bending of the platform. A protective skin is formed over this sheet.

The sheets, the buttress material, and the corrugation, are bonded into a continuous structure A bonded-together continuous structure is sometimes referred herein as a "monolithic composite".

When subjected to bending forces, the composite functions best when the axis of the corrugations is in the bending plane. Frequently it will be advantageous to reinforce the lower surface side which will be convex, with reinforcement material to withstand resultant tensile forces which could crack the bottom of the structure. As a practical matter, the reinforcement material will be applied to both sides so that either side may be made the top or bottom. Strands such as glass fibers may for this purpose be incorporated onto the composite. These have no function as to compressive strength, but they do improve the resistance to bending. These are optional. In addition to the strands in this alignment, cross strands can be provided, which can laid in place, or woven together.

The bonded joinder of this assembly may consist of adhesive bonds at the various interfaces. Preferably the material will all be porous so that a bonding material can penetrate the entire structure. The preferred embodiment is a structural foam used as the buttressing material which penetrates or envelopes the other members. This is a light-weight arrangement, and can be self-skinning as well.

The above and other features of this invention will be fully understood from the following detailed description and the accompanying drawings in which:

DETAILED DESCRIPTION OF THE INVENTION

Figure 1:
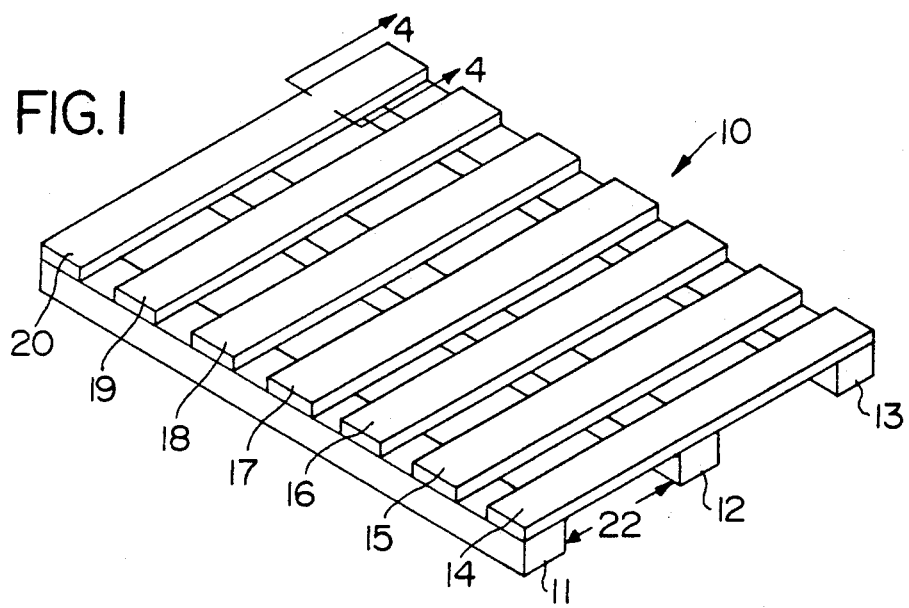
FIG. 1 is an isometric view showing the presently preferred embodiment of the invention.
Figure 2:
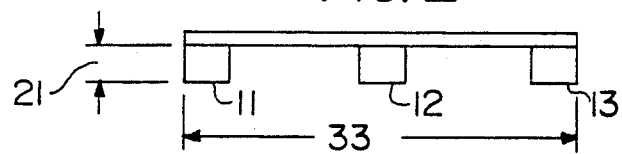
FIG. 2 is an end view of FIG. 1.
Figure 3:
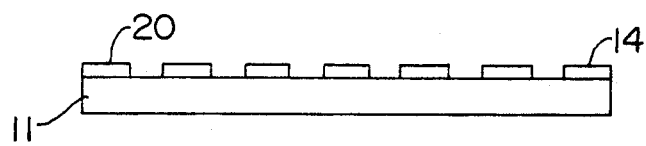
FIG. 3 is a side view of FIG. 1.

FIG. 1 shows a pallet 10 having runners 11,12,13 and slats 14,15,16,17,18,19 and 20. The runners underlay the slats. The slats are attached to the runners by an acceptable means (not shown), such as adhesives or mechanical fasteners. Acceptable mechanical fasteners may include nails adapted to be driven into and retained by composite structures, expansion bolts, and nut-bolt combinations with heads and nuts suitably recessed. These are exemplary of a wide range of alternatives.

The dimension of thickness 21 of the runners provides room for forklift tongues to be inserted beneath the slats. The span length 22 between the slats is a parameter to be considered in the design of the composite to be used.

The slats create a "platform" on which articles are to be placed. While from a weight and expense standpoint slats are to be preferred, it is within the scope of this invention to provide a unitary, single piece platform instead. The term "platform" includes both.

The slats and runners are preferably made from the same composite material. If greater thickness is needed, it usually will be best practice to bond together a number of layers, of this material rather than to scale up the dimensions of a single layer.

Also, in the manufacture of an economically optimized pallet, the use of materials which are already produced in large quantities is advantageous. One such product may be used for certain layers and for the corrugation. This material is a phenolicresin-bonder sheet of randomly-laid glass fibers used in the roofing trades. It is porous with glass strands about 1 inch long. It weighs about 1.2 pounds per hundred square feet. It has a minor tensile strength- about 30 pounds per inch, which is useful but sometimes not enough, and excellent columnar properties when side supported. It is commercially available from Conglas Inc. of Bakersfield, Ca. under the mark "CONGLAS".

Reinforcing glass fibers, usually about 16 microns in diameter, are useful for their tensile properties. These fibers are obtainable from a wide variety of commercially sources.

It is most convenient to form this composite in a continuous process rather than to make sub-parts and then bond them together. Accordingly the use of a single plastic material for filling and bonding is to be preferred. Also, although non-foamed plastic materials are useful, they will be heavier. For this reason foams are to be preferred. The outside surfaces must resist at least minor abrasion, so a skin must be provided. The use of a self-skinning plastic material is preferred because it requires one less manufacturing step. Urethane foams are self-skinning.

Figure 4:
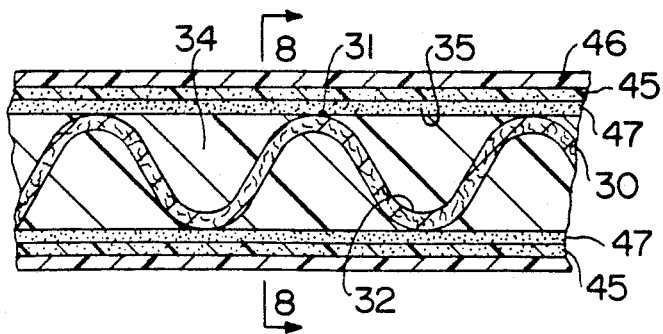
FIG. 4 is a cross-section taken at line 4—4 in FIG. 1.

With the foregoing in mind, the composite structure in FIG. 4 will be discussed. Slat 20 is shown. The other slats and the runners will preferably be made of similar material. In the illustration, the bending plane runs in the direction of length of the illustrated slats. When the slats are loaded, they tend to deflect downwardly, becoming concave at the top and there in compression, and convex on the bottom, and there they will be in tension. There is no problem with compression, but the tension stress may cause the slat to crack at the bottom center of the span if the tensile strength is exceeded.

To allow for greater load weight, glass fibers 45 as already described are laid as parallel strands atop the reinforcement sheet. These have substantial tensile strength and are provided in quality as needed. Usually they will be applied to the adhesive or foam surface before it sets up so the strands are incorporated into the matrix, and then the matrix skins over to form skin 46.

Figure 7:
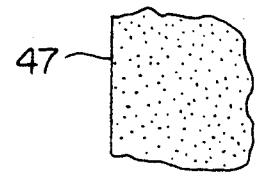
FIG. 7 is a fragmentary view of an alternative material of construction.
Figure 8:
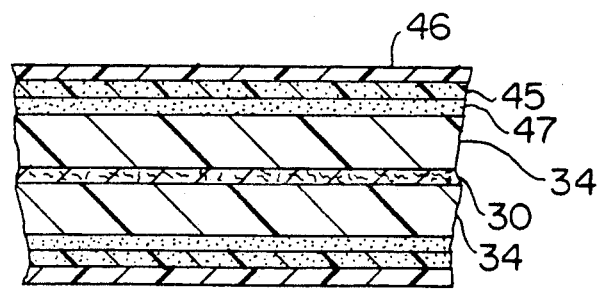
FIG. 8 is a cross-section taken at line 8—8 in FIG. 4.

As shown in FIG. 7, glass fiber cloth 47 can be substituted for the randomly laid material preferred for the corrugation and for the reinforcement layer.

A corrugation 30 made of the above described material is shown with crests 31 and troughs 32, which extend along a dimension of length 33. Butresses 34 fill the troughs and are bonded to the corrugation. Preferably the corrugation is porous as described, so the buttress material not only bonds to the corrugation, but penetrates into it and becomes integral with it.

The butresses are preferably made of closed-cell structural foam.

To the boundary 35 of the buttresses and to the crests of the corrugations there is applied a reinforcement sheet 40 of material having tensile properties. Preferably it is the sheet material already described. It is bonded at the boundary. Preferably the foam material penetrates the sheet and extends beyond it to cover it. For many structures this will be adequate, and the foam forms a skin, or a skin material is applied to it.

Figure 5:
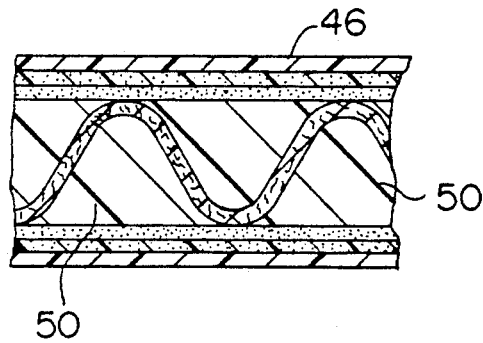
FIG. 5 is a cross-section taken similarly to FIG. 4, showing another embodiment of the invention.
Figure 6:
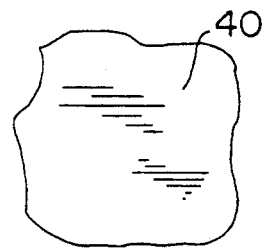
FIG. 6 is a fragmentary plan view of a material useful for the corrugation and reinforcement.

FIG. 5 illustrates that solid pre-prepared inserts 50 can be fitted into the troughs of the corrugation and bonded to the corrugation. This will rarely be preferred. Also, non-foaming settable plastics may be used throughout, but these involve a weight penalty.

The preferred embodiment of composite is the unitary formed construction of FIG. 1. It is optimum for weight, and sufficient for strength. The pallet shown can conveniently have over all deck dimensions of 42×48 inches and carry a load of 2,000 pounds, while weighing only about 6½ pounds. This compares to a conventional wooden pallet of the same dimensions which weighs about 61 pounds. The load carrying capacities can be made roughly equal.

While the pallet of this invention costs more than a wood pallet, the savings made in the course of its employment more than justifies the additional expense for many applications.

This invention is not to be limited by the embodiment shown in the drawings and described in the description, which are given by way of example and not of limitation, but only in accordance with the scope of the appended claims.

I claim:

1. A load-carrying pallet comprising: a platform and a plurality of runners beneath said platform and attached to it, said platform and runners being constructed of composites bonded together, said platform and each runner comprising:
- a corrugation of sheet material, said corrugation having longitudinally extending crests and troughs,
- buttresses filling said troughs and abutting said corrugation so as to give support to the corrugation against lateral collapse, said buttresses having a boundary,
- a reinforcement member on said boundary, said reinforcement member being a sheet material having substantial tensile strength, and
- a skin layer forming a surface on said composite, said skin surface including a plurality of linear reinforcing fibers strands laid in the direction of the crests, all of said sheet material, buttresses, skin surface layer and strands being bonded together to form a monolithic composite.

2. A pallet according to claim 1 in which said sheet material comprises randomly-laid, bonded-together glass fibers.

3. A pallet according to claim 1 in which said buttresses are formed from an initially fluid plastic material penetrated into said sheet materials and cured to a solid.

* * * * *